United States Patent
Marmaropoulos et al.

(10) Patent No.: US 6,462,437 B1
(45) Date of Patent: Oct. 8, 2002

(54) SYSTEM AND METHOD FOR ALTERNATING STANDBY MODE

(75) Inventors: George Marmaropoulos, Yorktown Heights; Ihor T. Wacyk, Briarcliff Manor, both of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/439,195

(22) Filed: Nov. 12, 1999

(51) Int. Cl.$^7$ .............................................. H02M 3/335
(52) U.S. Cl. .......................... 307/125; 348/730; 363/21
(58) Field of Search ................................ 307/125, 140, 307/38; 363/21, 49; 348/730

(56) References Cited

U.S. PATENT DOCUMENTS

| | | | |
|---|---|---|---|
| 4,688,159 A | * | 8/1987 | Marinus ........................ 363/21 |
| 4,868,662 A | * | 9/1989 | Hartman et al. ............. 315/411 |
| 4,975,592 A | * | 12/1990 | Hahn et al. .................... 307/38 |
| 5,381,329 A | * | 1/1995 | Koblitz et al. ................. 363/49 |
| 5,477,279 A | * | 12/1995 | Chang ......................... 348/730 |
| 5,689,407 A | * | 11/1997 | Marinus et al. .......... 363/21.12 |
| 5,812,383 A | * | 9/1998 | Majid et al. .................... 363/21 |
| 5,852,550 A | * | 12/1998 | Majid et al. .................... 363/21 |
| 5,995,384 A | * | 11/1999 | Majid et al. .................... 363/21 |
| 6,018,467 A | * | 1/2000 | Majid et al. .................... 363/16 |
| 6,157,549 A | * | 12/2000 | Nath ........................... 348/730 |
| 6,188,587 B1 | * | 2/2001 | Yun et al. ...................... 363/21 |
| 6,191,959 B1 | * | 2/2001 | Miermans .................... 363/21 |

FOREIGN PATENT DOCUMENTS

JP 2000-224844 * 11/2000

* cited by examiner

Primary Examiner—Fritz Fleming
Assistant Examiner—Roberto J. Rios
(74) Attorney, Agent, or Firm—Dicran Halajian

(57) ABSTRACT

An apparatus and method for reducing the level of power consumption in an electronic device when the electronic device is operating in a standby mode or low-power mode. The level of power consumption is reduced by alternately shutting off standby power and turning on standby power to the electronic device. A standby cycle timer circuit is provided for automatically controlling the supply of standby power to the electronic device during standby mode. The standby cycle timer circuit becomes inactive when the electronic device resumes normal operation.

26 Claims, 4 Drawing Sheets

SYSTEM AND METHOD FOR ALTERNATING STANDBY MODE

TECHNICAL FIELD OF THE INVENTION

The present invention is directed, in general, to electronic devices and, more specifically, to an apparatus and method for reducing the level of power consumption in an electronic device when the electronic device is operating in a standby mode or low-power mode.

BACKGROUND OF THE INVENTION

In electronic devices it is sometimes desirable to operate the device in a standby mode (also called a low-power mode) rather than to turn off all power to the device when the device is not in use. For example, in a television set it is customary to continually supply power to the heating elements of the electronic circuitry even when the set is otherwise turned off. This permits the electronic circuitry that operates the various components of the television set (e.g., circuitry that operates the cathode ray tube of the television screen) to very quickly achieve the proper level of operation when the set is turned on. If one did not keep the set minimally powered in a standby mode it would be necessary to wait for the heating elements of the set to warm up when the set was turned on.

Therefore, it is desirable and useful to use the standby mode in electronic devices such as radio sets, television sets, stereo sets, and other similar types of electronic devices. The amount of energy that is consumed when an electronic device is in standby mode is small in comparison to the amount of power that the electronic device uses when the set is turned on. However, because the use of standby mode in electronic devices is so widespread and because the use of standby mode does consume electric power, the power that is consumed by standby mode in the aggregate is quite large. To realize the magnitude of the aggregate power consumption due to use of the standby mode, one may multiply the small amount of power consumed in one television set that is operating in standby mode by the millions of television sets that exist in the world today.

Certain improvements in electronic design within the last few years have reduced the amount of power consumption that is due to the operation of standby mode circuitry. Because the aggregate amount of standby mode power consumption is still quite large, however, there still remains a need to find additional ways to further reduce the level of standby mode power consumption in electronic devices.

SUMMARY OF THE INVENTION

To address this problem, it is a primary object of the present invention to provide an apparatus and method for reducing the level of power consumption in an electronic device that is operating in standby mode.

It is a further object of the present invention to provide a means for reducing the amount of power consumption in an electronic device that is operating in standby mode by at least fifty percent.

The apparatus and method of the present invention will be described as an apparatus and method for reducing the level of power consumption in a television set that is operating in a standby power mode. It is important to realize that the apparatus and method of the present invention is not limited to only a television set. Those skilled in the art will readily understand that the principles of the present invention may also be successfully applied to other types of electronic devices. However, in the descriptions that follow, a television set is employed for illustration purposes In the preferred embodiment of the invention, the invention comprises a standby cycle timer circuit coupled within a television power supply circuit capable of operating in a standby mode. The standby cycle timer causes the power supply circuit to alternate between its standard standby mode and a shutdown power mode. In a shutdown power mode, all power from the power supply circuit to other circuit elements is turned off. After a predetermined period of time has elapsed, the shutdown power mode is terminated and the standby power mode is resumed. After another predetermined period of time has elapsed, the standby power mode is terminated and the shutdown power mode is resumed. The alternation of the standby power mode and the shutdown power mode continues until the television receives an "on" signal to power up the television for normal operation.

If the time that the shutdown power mode is in operation is equal to the time that the standby power mode is in operation, then the power consumption of the combination is half of the power consumption required to otherwise operate in only the standby power mode. If the time that the shutdown power mode is in operation is greater than the time that the standby power mode is in operation, then the power consumption of the combination will be less than half of the power consumption required to otherwise operate in only the standby power mode. Therefore, the invention provides a significant reduction in the amount of power needed to operate a television in a standby power mode.

In a typical television power supply circuit, a pulse width modulator circuit controls the operation of the power supply circuit by alternately turning the power on and off in the primary side of a flyback transformer circuit. The pulse width modulator circuit puts the power supply circuit into standby mode turning off the power for longer periods of time.

The standby cycle timer of the present invention is coupled to the pulse width modulator circuit. The standby cycle timer alternately sends "on" and "off" signals to said pulse width modulator circuit. When the standby cycle timer sends an "on" signal, the pulse width modulator circuit causes the power supply circuit to operate in a standby mode. When the standby cycle timer sends an "off" signal, the pulse width modulator circuit causes the power supply circuit to operate in a shutdown mode. The standby cycle timer causes the "on" and "off" signals to be sent to the pulse width modulator circuit at specific time intervals. The time intervals are predetermined by the choice of particular values for certain circuit elements in the standby cycle timer.

The standby cycle timer automatically alternates between sending the required "on" and "off" signals to the pulse width modulator circuit. The alternate "on" and "off" signals control the pulse width modulator so that it causes the power supply circuit to automatically alternate between the standby mode and the shutdown mode. When the television receives an external signal to resume normal operation, the standby cycle timer automatically ceases sending the alternate "on" and "off" signals, and sends only an "on" signal to the pulse width modulator circuit so that the power supply circuit can provide continuous operating power to the television.

When the television receives an external signal to cease normal operation, the standby cycle timer automatically resumes sending the alternate "on" and "off" signals to the pulse width modulator circuit to resume alternating between the standby mode and the shutdown mode.

The foregoing has outlined rather broadly the features and technical advantages of the present invention so that those skilled in the art may better understand the Detailed Description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality, associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged electronic device capable of operating in a standby or low power mode.

Figure 1:
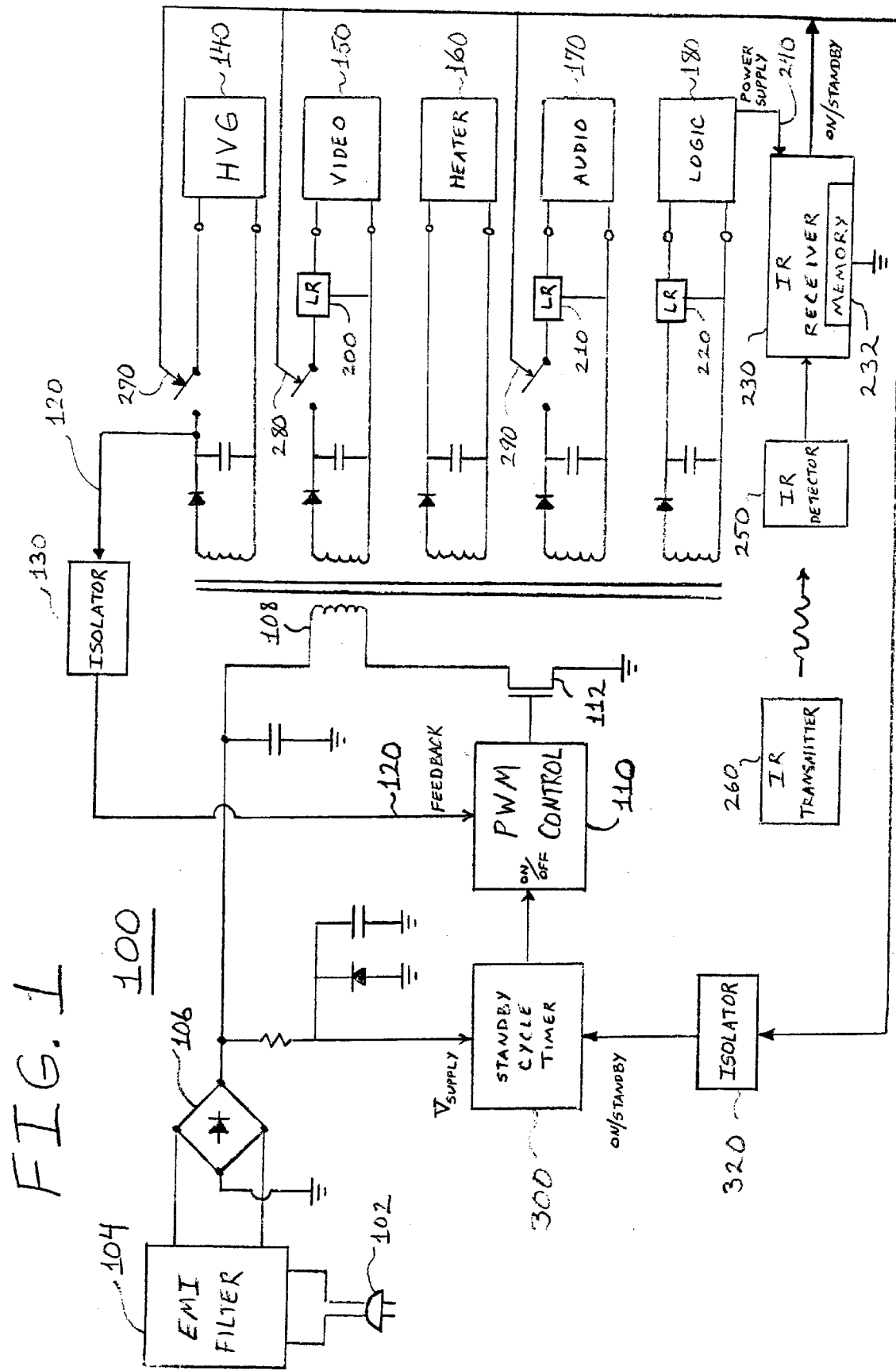
FIG. 1 is a simplified circuit diagram of a typical power supply circuit with multiple outputs for powering a television set showing the connection of the standby cycle timer of the present invention within said power supply circuit.

FIG. 1 shows a simplified circuit diagram of a typical power supply circuit 100 for powering a television set comprising a flyback transformer circuit with multiple outputs. The primary side of the transformer of the power supply circuit 100 comprises a power source 102 coupled to an electromagnetic interference (EMI) filter 104 coupled to a bridge rectifier circuit 106 coupled to the primary coil 108 of the transformer. The power supply circuit 100 is controlled by a standby controller 110. In the preferred embodiment of the invention the standby controller 110 is a pulse width modulator (PWM) control integrated circuit (IC) 110. For convenience, the pulse width modulator control integrated circuit 110 will be referred to as the PWM circuit 110. PWM circuit 110 controls the operation of power supply circuit 100 through transistor 112.

A feedback signal is fed back from one of the secondary side outputs through feedback loop 120 and is used to provide closed loop regulation of the PWM circuit 110. The feedback signal at the primary side is isolated from the secondary side by an isolator circuit 130 that may employ, for example, an opto-isolator device of a type well known in the prior art.

The secondary side consists of multiple outputs that are used to generate the different voltage levels required in a typical television. For example, the television may have a voltage output level connected to the high voltage gain (HVG) circuit 140 that has a value of several hundred volts. The HVG circuit 140 signal is fed to a voltage multiplier that ultimately delivers the several kilovolts needed by the cathode ray tube (CRT) (not shown). This signal may be tightly regulated by feedback loop 120.

A second output voltage having a value in the range of approximately one hundred volts to two hundred volts (100V 200V) is used to operate the video amplifiers 150 that modulate the CRT. A third output supply of approximately six volts (6V) is used to operate the heater 160 to heat the filament in the CRT. A fourth output voltage of twelve volts (12V) is used to drive the audio amplifiers 170. The fifth output voltage provides five volts (5V) for the logic circuits 180.

The output voltage for the video amplifiers 150 is regulated by providing a linear regulator (LR) 200 at the transformer output. The output voltage for the audio amplifiers 170 is regulated by a linear regulator (LR) 210 at the output. The output voltage for the logic circuits 180 is regulated by providing linear regulator (LR) 220 at the output. Only the output voltage for the HVG circuit 140 is well regulated by the primary side PWM circuit 110 through feedback loop 120. The other output voltages would usually suffer from poorer performance if they were not regulated with the linear regulators 200, 210, and 220.

In addition to delivering power during normal operation, the power supply circuit for the television must be capable of going into a standby mode. The standby mode dissipates as little power as possible but still provides some minimum functions. In the standby mode it is desirable to keep the CRT heaters 160 warm so that the television picture comes on nearly instantly when the television is turned back on. Also the power to the logic circuits 180 must be maintained in standby mode so that television's logic circuits 180 and the television's main microprocessor (not shown) can quickly power up when the television is turned back on.

The power to the logic circuits 180 in standby mode is also used to operate the infrared (IR) remote receiver 230 via power supply line 240. The IR receiver 230 receives a signal from the infrared (IR) detector 250 in response to a transmitted infrared on/off signal from an infrared transmitter 260 located in a typical hand-held television remote control unit.

The IR receiver 230 also contains a memory circuit 232 for storing signal values during the times when IR receiver 230 is without power during the shutdown mode.

The output voltage circuit that supplies power to the HVG circuit 140 has a switch 270 in series with the load so that during standby mode the switch 270 is opened to turn off power to the HVG circuit 140. Similarly, the output voltage circuit that supplies power to the video amplifiers 150 has a switch 280 in series with the load so that during standby mode the switch 280 is opened to turn off power to the video amplifiers 150. Similarly, the output voltage circuit that supplies power to the audio amplifiers 170 has a switch 290 in series with the load so that during standby mode the switch 290 is opened to turn off power to the audio amplifiers 170.

When the standby mode is operating, switch 270, switch 280, and switch 290 are opened by the IR receiver 230 to turn off power to the respective circuit branches controlled by these switches. Alternatively, switch 270, switch 280, and switch 290 may be opened by the television's main microprocessor (not shown) during standby mode. As a result of switch 270, switch 280, and switch 290 being opened during standby mode, the power that is consumed by the television is substantially lower in standby mode than it is in normal operating mode.

Even so, there are significant inefficiencies involved in operating the television power supply circuit in a standby mode. Most power supplies run most efficiently at high output power levels. Power supply operating efficiency drops off significantly when the power supply is operated at low output power levels. This inefficiency contributes to additional unnecessary power consumption. Therefore, it is desirable to reduce the level of power consumption in the standby mode as much as possible.

To further reduce the level of power consumption during standby mode, the present invention provides an apparatus and method for operating the power supply circuit with an alternating standby mode. That is, the present invention causes the power supply circuit to alternate between a standby mode of operation and a shutdown mode.

In the shutdown mode all power to the secondary side of the power supply is turned off completely. This means that during the time interval of the shutdown mode the heater circuit 160 is turned off, and the logic circuits 180 are turned off, and the IR receiver 230 is turned off. If the duty ratio between the standby mode and the shutdown mode is designed to be fifty percent, then the standby mode is on half of the time and the shutdown mode is on half of the time. Then the standby power consumed using the alternating mode method of the present invention is half of the standby power consumed when one uses the standard standby mode method. Because the heater current in heater 160 will also be reduced by half, the time to start up the television will be slightly increased compared to the time to start up the television using the standard standby mode method.

If the duty ratio between the standby mode and the shutdown mode is designed to be less than fifty percent, then the standby mode is on less than half of the time and the shutdown mode is on more than half of the time. Then the standby power consumed using the alternating mode method of the present invention is less than half of the standby power consumed when one uses the standard standby mode method.

To implement the alternating standby mode of the present invention, a new control circuit is added to the primary side of the power supply circuit. The new control circuit is the standby cycle timer 300. The standby cycle timer 300 controls the PMW circuit 110 through the PMW circuit's "on/off" input as shown in FIG. 1. The standby cycle timer 300 is controlled by the ON/STANDBY signal from the IR receiver 230 on the secondary side of the power supply circuit. IR receiver 230 sends either an ON signal or a STANDBY signal to the standby cycle timer 300. The signal at the standby cycle timer 300 is isolated from the secondary side of the power supply circuit by an isolator circuit 320 that may employ, for example, an opto-isolator device of a type well known in the prior art.

When the ON/STANDBY signal is not active (when normal operation of the television is in progress), the standby cycle timer 300 generates a continuous "on" signal to the PWM circuit 110. When the ON/STANDBY signal is activated, then the standby cycle timer 300 generates an alternating signal with a preset duty ratio and frequency to alternately turn the PWM circuit 110 on and off.

Figure 2:
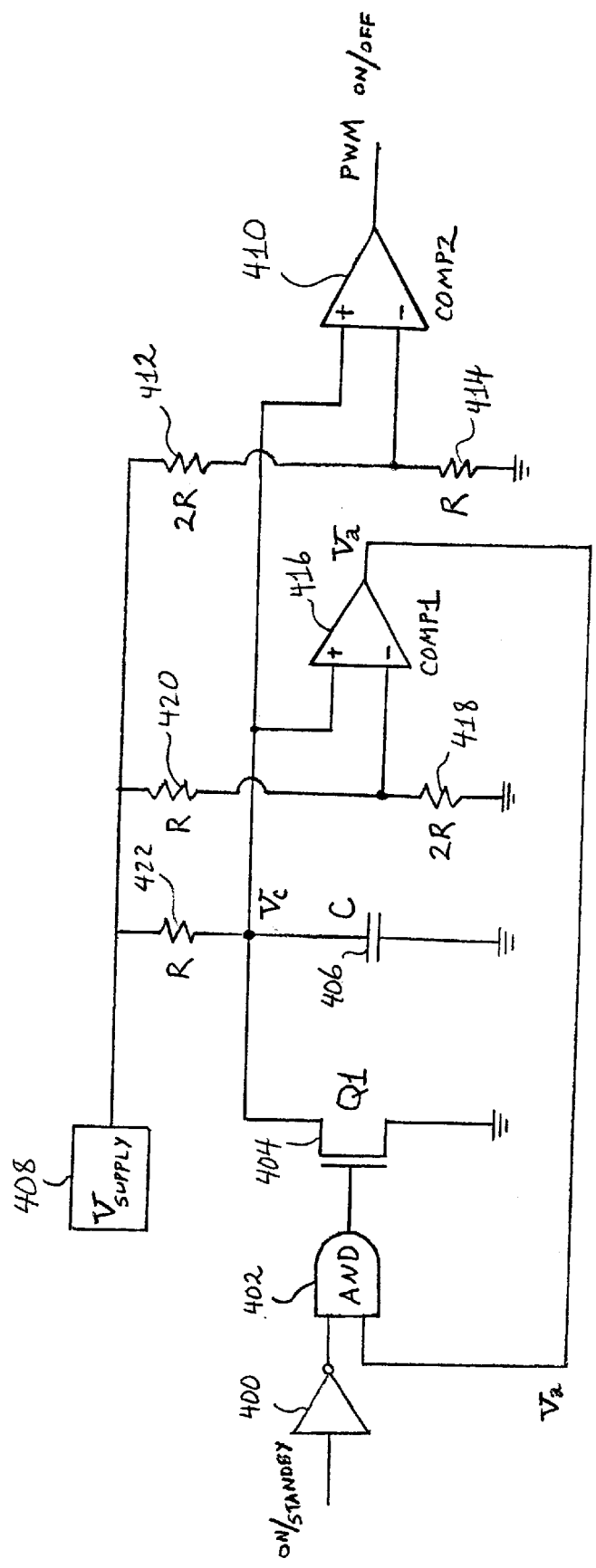
FIG. 2 is a circuit diagram of a standby cycle timer of the present invention.

A preferred embodiment of the standby cycle timer 300 of the present invention is shown in FIG. 2. When the ON/STANDBY signal is high (the ON state) then the output of inverter 400 is low and the output of AND gate 402 is also low. The low output state from AND gate 402 turns off transistor Q1 404. When transistor Q1 404 is off, capacitor C 406 begins to charge from the $V_{supply}$ voltage 408. The voltage on capacitor C 406 begins to rise toward the voltage level of the $V_{supply}$ voltage 408.

As the voltage on capacitor C 406 increases toward the value of the $V_{supply}$ voltage 408, the output of Comparator COMP 2 (410) is forced to go high as well because its threshold on its negative input is only one third (⅓) of the $V_{supply}$ voltage 408. This is due to the fact that the value of resistor 412 is chosen to be twice the value of resistor 414 and the negative input of Comparator Two 410 is connected to the circuit node that connects resistor 412 and resistor 414. As a result the output of Comparator Two 410 is high and the input to the PWM circuit 110 is always "on".

When the ON/STANDBY signal goes low (when the television is in the standby mode) then the output of inverter 400 is high and the output of AND gate 402 is also high because the $V_a$ signal from Comparator One 416 is high. The high output state from AND gate 402 turns on transistor Q1 404. Turning on transistor Q1 404 forces capacitor C 406 to discharge and bring $V_c$ quickly down to a value of zero volts.

The threshold to the negative input of Comparator One 416 is two thirds (⅔) the value of the $V_{supply}$ voltage 408. This is due to the fact that the value of resistor 418 is chosen to be twice the value of resistor 420 and the negative input of Comparator One 416 is connected to the circuit that connects resistor 418 and resistor 420. Because the threshold to the negative input of Comparator One 416 is two thirds (⅔) the value of the $V_{supply}$ voltage 408, the output of Comparator One 416 will go low when $V_c$ drops to zero volts. At the same time, the output of Comparator Two 410 will also go low, and thereby send an "off" signal to the PWM circuit 110. The PWM circuit 110 then will turn itself off.

Now because the output of Comparator One 416 is low, the output of the AND gate 402 also goes low and turns off transistor Q1 404. After transistor Q1 404 is turned off, the voltage on capacitor C 406 will slowly increase with a time constant RC. The time constant RC. is the product of the resistance of resistor R 422 and the capacitance of the capacitor C 406. When the voltage at $V_c$ reaches a value of one third (⅓) of the value of the $V_{supply}$ voltage 408, the output of Comparator Two 410 goes high. A high output from Comparator Two 410 sends an "on" signal to PWM circuit 110. The "on" signal turns on the PWM circuit 110 and causes the power supply circuit 100 to resume the standby mode.

Figure 3:
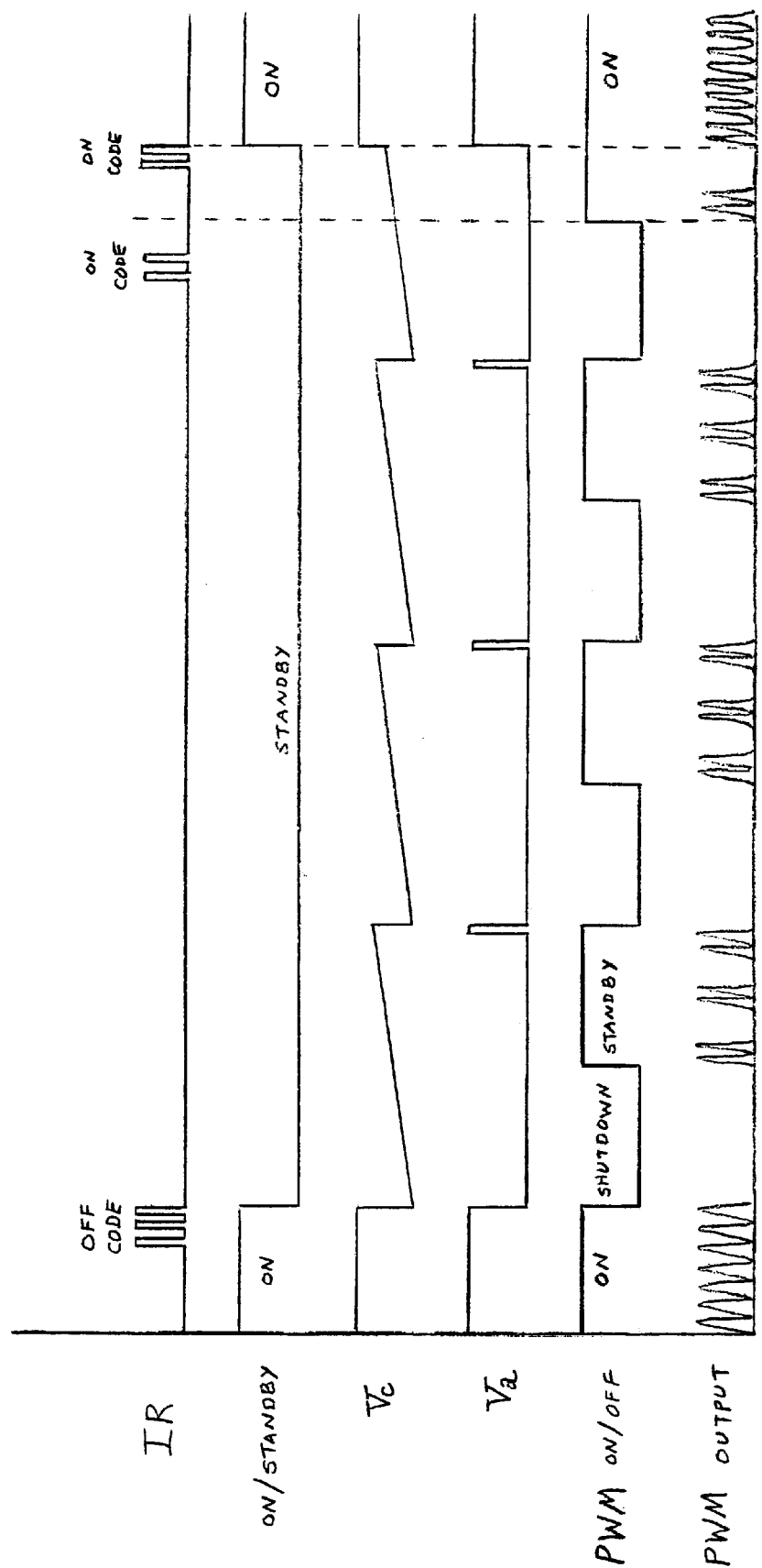
FIG. 3 is a timing diagram of the electronic signals that are utilized in the present invention.

When the voltage at $V_c$ reaches two thirds (⅔) of the $V_{supply}$ voltage 408, the output of Comparator One 416 goes high and the cycle repeats itself as shown in FIG. 3. By setting appropriate values for the capacitor C 406 and for the resistors 412, 414, 418, 420, and 422, the frequency and the duty ratio of the alternating standby mode signal may be easily adjusted to any desired values.

The operation of the power supply circuit utilizing the present invention that has been described above is illustrated in the timing diagram shown in FIG. 3. Following the reception of an "off" signal from the IR transmitter 260, the ON/STANDBY output signal from the IR receiver 230 goes low. At the same time the signals $V_c$, $V_a$, and PWM on/off all go low, and the power supply circuit 100 is put into the shutdown mode. The switching signal from the PWM circuit 110 is completely turned off. After a period of time determined by the component values of resistor R 422 and capacitor C 406, the standby mode is activated. Now the PWM circuit 110 enters its standby mode (low power mode) of operation which is usually a form of burst mode in which the PWM circuit 110 cycles between "high frequency switching" and "off" at a rate of a few kilohertz.

The alternation of the shutdown modes and the standby modes continues until the IR transmitter 260 sends an "on" signal that is received by the IR receiver 230. Since the IR receiver 230 is only active during the standby mode, the transmission must be sent several times to ensure that it overlaps with the time during which the IR receiver 230 is on. In FIG. 3 the first "on" transmission from the IR transmitter 260 arrives during a shutdown period and is not received. The second "on" transmission from the IR transmitter 260 arrives during a standby period and is received.

IR receiver 230 stores signal information in memory 232 so that IR receiver 230 can remain in the standby mode when it is powered up during alternating standby cycles. That is, memory 232 stores signal information for IR receiver 230 during the times when IR receiver 230 is without power during the shutdown mode.

The duration of the standby mode and the duration of the shutdown mode can be on the order of one fourth (¼) of a second. Because the time required to push the "power on" button in a television is likely be more than one fourth (¼) of a second, it is likely that the television will be in at least a portion of one standby mode cycle when the "power on" button is pushed and the corresponding "on code" is received. Therefore television viewers in most instances will be able to turn on the television with a single push of the "power on" button. If the television does not turn on after the first push of the "power on" button, the viewer can simply push the "power on" button again.

Figure 4:
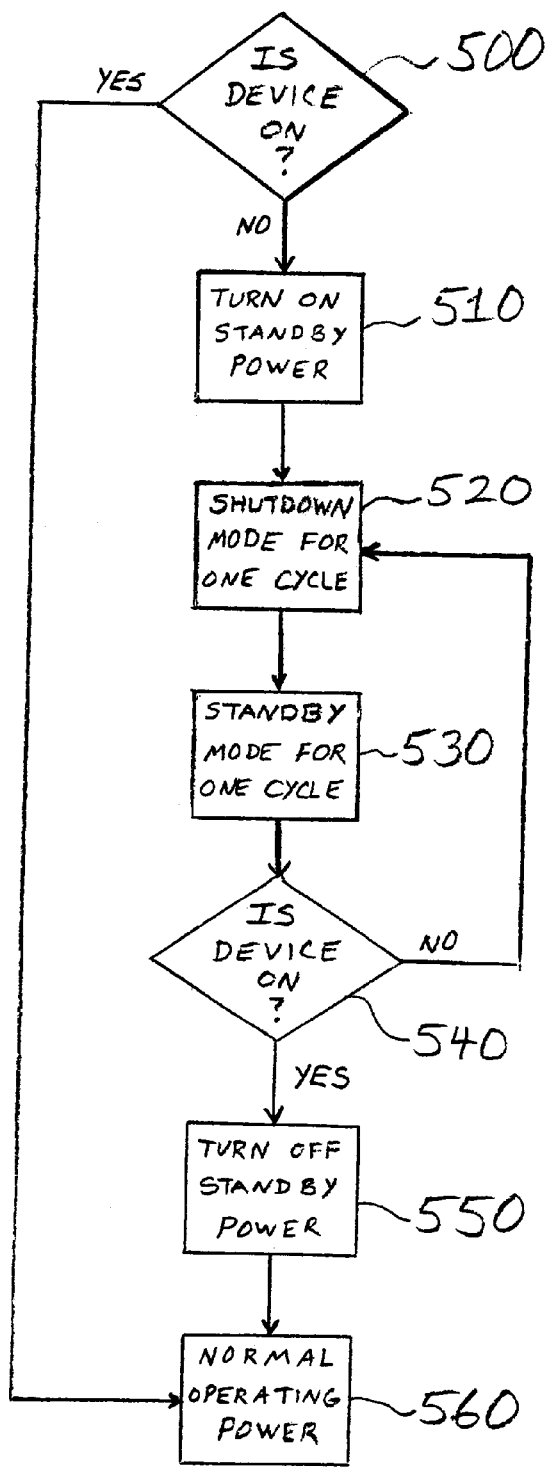
FIG. 4 is a flow diagram illustrating the logic of the operation of the alternating standby mode apparatus of the present invention.

FIG. 4 is a flow diagram illustrating the logic of the operation of an exemplary alternating standby mode apparatus of the present invention. In decision step 500 a determination is made whether the electronic device is on. If the electronic device is on, then the normal operating power is used as shown in operation step 560. If the electronic device is not on, then the standby power is turned on as shown in operation step 510.

Then the electronic device is operated in the shutdown mode for one cycle as shown in operation step 520. Then the electronic device is operated in the standby mode for one cycle as shown in operation step 530. Then in decision step 540 a determination is again made whether the electronic device is on. If the electronic device is on, then the standby power is turned off as shown in operation step 550 and the normal operating power is used as shown in operation step 560.

If the electronic device is not on, then the electronic device is again operated in the shutdown mode for one cycle as shown in operation step 520 and the cycle repeats. The alternation between the standby mode and the shutdown mode continues indefinitely until the electronic device is turned back on.

Although the present invention has been described in detail with respect to a television power supply, those skilled in the art should understand that they can make various changes, substitutions and alterations herein without departing from the spirit and scope of the invention in its broadest form.

What is claimed is:

1. An apparatus for reducing the level of power consumption in a television having television component circuitry that is operative in a standby mode comprising:

an electronic control circuit capable of alternately shutting off power and turning on power to said television. component circuitry when said television component circuitry is operating in a standby mode, a transformer having a primary winding and multiple secondary windings for supplying power to the circuitry of the electronic device, means for coupling the transformer primary winding to the electronic control circuit, and means for supplying a control signal to the electronic control circuit that is independent of transformer voltage in the standby mode of the electronic device.

2. The apparatus as set forth in claim 1 wherein said electronic control circuit capable of alternately shutting off power and turning on power to said circuitry when said circuitry is operating in a standby mode comprises: a standby cycle timer circuit for controlling the supply of power to said circuitry.

3. An apparatus as claimed in claim 1 wherein said electronic device comprises a standby controller for controlling power to said circuitry to cause said circuitry to operate in a standby mode, and wherein said electronic control circuit capable of alternately shutting off power and turning on power to said circuitry when said circuitry is operating in a standby mode comprises:

an electronic control circuit for alternately shutting off and turning on said standby controller to cause power. to said circuitry to alternately shut off and turn on when said circuitry is operating in a standby mode.

4. The apparatus as set forth in claim 3 wherein said electronic control circuit capable of alternately shutting off and turning on said standby controller to cause power to said circuitry to alternately shut off and turn on when said circuitry is operating in a standby mode comprises:

a standby cycle timer circuit for controlling said standby controller to control the supply of power to said circuitry.

5. The apparatus as set forth in claim 4 wherein said standby cycle timer circuit comprises:

an electronic control circuit capable of continuously sending an "on" signal to said standby controller when said electronic device is operating; and an electronic control circuit capable of alternately sending "on" and "off" signals to said standby controller when said electronic device is in standby mode.

6. The apparatus as set forth in claim 5 further comprising:

an electronic control circuit capable of resuming continuously sending an "on" signal to said standby controller when said electronic device ceases to be in standby mode.

7. The apparatus as set forth in claim 5 wherein said electronic control circuit capable of alternately sending "on" and "off" signals to said standby controller when said electronic device is in standby mode comprises:

an electronic control circuit capable of sending each "on" signal for a specified length of time; and an electronic control circuit capable of sending each "off" signal for the same specified length of time as each "on" signal.

8. The apparatus as set forth in claim 3 wherein, in the standby mode, the standby controller shuts off power to the other circuitry of the electronic device throughout the entire standby mode.

9. The apparatus as set forth in claim 1 further comprising;

switching means for selectively coupling at least one secondary winding of the transformer to other circuitry of the electronic device thereby to shut-off power to said other circuitry throughout the entire standby mode.

10. The apparatus as set forth in claim 9 further comprising an infrared receiver for receiving an external infrared signal and processing same to derive a control signal, and wherein the switching means is selectively controlled on and off by said control signal.

11. An apparatus for reducing the level of power consumption in a television having television component circuitry that is operative in a standby mode comprising:

an electronic control circuit capable of alternately shutting off power and turning on power to said television component circuitry when said television component circuitry is operating in a standby mode, a transformer having a primary winding and multiple secondary windings for supplying power to the circuitry of the electronic device.

means for supplying a control signal to the electronic control circuit that is independent of transformer voltage in the standby mode of the electronic device.

12. The apparatus as set forth in claim 11 wherein said electronic control circuit capable of alternately shutting off power and turning on power to said television component circuitry when said television component circuitry is operating in a standby mode comprises:

a standby cycle timer circuit for controlling the supply of power to said television component circuitry.

13. An apparatus as claimed in claim 11 wherein said television receiver comprises a standby controller for controlling power to said television component circuitry to cause said television component circuitry to operate in the standby mode, and wherein said electronic control circuit capable of alternately shutting off power and turning on power to said television component circuitry when said television component circuitry is operating in a standby mode comprises:

an electronic control circuit capable of alternately shutting off and turning on said standby controller to cause power to said television component circuitry to alternately shut off and turn on when said television component circuitry is operating in a standby mode.

14. The apparatus as set forth in claim 13 wherein said electronic control circuit capable of alternately shutting off and turning on said standby controller to cause power to said television component circuitry to alternately shut off and turn on when said television component circuitry is operating in a standby mode comprises:

a standby cycle timer circuit for controlling said standby controller to control the supply of power to said television component circuitry.

15. The apparatus as set forth in claim 14 wherein said standby cycle timer circuit comprises:

an electronic control circuit capable of continuously sending an "on" signal to said standby controller when said television receiver is operating; and an electronic control circuit capable of alternately sending "on" and "off" signals to said standby controller when said television receiver is in standby mode.

16. The apparatus as set forth in claim 15 further comprising:

an electronic control circuit capable of resuming continuously sending an "on" signal to said standby controller when said television receiver ceases to be in standby mode.

17. The apparatus as set forth in claim 15 wherein said electronic control circuit capable of alternately sending "on" and "off" signals to said standby controller when said television receiver is in standby mode comprises:

an electronic control circuit capable of sending each "on" signal for a specified length of time; and an electronic control circuit capable of sending each "off" signal for the same specified length of time as each "on" signal.

18. The apparatus as set forth in claim 11 wherein, in the standby mode, the electronic control circuit shuts off power to the other TV component circuitry of the television receiver throughout the entire standby mode.

19. A method for reducing the level of power consumption in an electronic device having circuitry that is capable of operating in a standby mode comprising the steps of:

shutting off power to said circuitry by an off signal when said circuitry is operating in a standby mode;

turning on power to said circuitry by an on signal when said circuitry is operating in a standby mode, wherein said off signal and said on signal are essentially independent of load current of the electronic device; and repeating the above steps.

20. A method as set forth in claim 19 wherein said step of shutting off power to said circuitry when said circuitry is operating in a standby mode, and said step of turning on power to said circuitry when said circuitry is operating in a standby mode; and said step of repeating the above steps comprises:

shutting off a standby controller to cause power to said circuitry to shut off when said circuitry is operating in a standby mode;

turning on power to a standby controller to cause power to said circuitry to turn on when said circuitry is operating in a standby mode; and repeating the above steps.

21. A method as set forth in claim 20 wherein said step of shutting off a standby controller to cause power to said circuitry to shut off when said circuitry is operating in a standby mode, and said step of turning on power to a standby controller to cause power to said circuitry to turn on when said circuitry is operating in a standby mode; and said step of repeating the above steps comprises:

sending an "off" signal to said standby controller;

sending an "on" signal to said standby controller; and repeating the above steps.

22. A method as set forth in claim 21 together with the step of:

ceasing to perform the steps set forth in claim 17 when said electronic device is not in standby mode; and continuously sending an "on" signal to said standby controller when said electronic device is not in standby mode.

23. A method as set forth in claim 21 further comprising the steps of:

sending an "off" signal to said standby controller for a specified length of time;

sending an "on" signal to said standby controller for the same specified length of time as said "on" signal; and repeating the above steps.

24. A method for reducing the level of power consumption in an electronic device having circuitry that is capable of operating in a standby mode comprising the steps of:

shutting off power to said circuitry when said circuitry is operating in a standby mode;

turning on power to said circuitry when said circuitry is operating in a standby mode;

repeating the above steps;

wherein said step of shutting off power to said circuitry when said circuitry is operating in a standby mode, and said step of turning on power to said circuitry when said circuitry is operating in a standby mode; and said step of repeating the above steps comprises:

shutting off a standby controller to cause power to said circuitry to shut off when said circuitry is operating in a standby mode;

turning on power to a standby controller to cause power to said circuitry to turn on when said circuitry is operating in a standby mode; and repeating the steps of shutting off a standby controller and shutting off a standby controller; and wherein said step of shutting off a standby controller to cause power to said circuitry to shut off when said circuitry is operating in a standby mode, and said step of turning on power to a standby controller to cause power to said circuitry to turn on when said circuitry is operating in a standby mode; and said step of repeating the above steps comprises:

sending an "off" signal to said standby controller;

sending an "on" signal to said standby controller; and repeating the sending steps; and sending the "off" signal to said standby controller for a specified length of time;

sending the "on" signal to said standby controller signal for a specified length of time that is less than the specified length of time of said "off" signal wherein said "off" and "on" signals are essentially independent of load current of the electronic device; and repeating the sending steps.

25. An apparatus for reducing the level of power consumption in an electronic device having circuitry that is capable of operating in a standby mode comprising:

an electronic control circuit capable of alternately shutting off power and turning on power to said circuitry when said circuitry is operating in a standby mode;

a transformer having a primary winding and multiple secondary windings for supplying power to the circuitry of the electronic device, means for coupling the transformer primary winding to the electronic control circuit, an infrared receiver for receiving an external infrared signal and processing same to derive a control signal for control of the electronic control circuit, wherein one secondary winding provides a supply voltage for the infrared receiver so that the infrared receiver loses its supply voltage for that part of the standby mode when power is shut off to said circuitry of the electronic device.

26. An apparatus for reducing the level of power consumption in an electronic device having circuitry that is capable of operating in a standby mode comprising:

an electronic control circuit capable of alternately shutting off power and turning on power to said circuitry when said circuitry is operating in a standby mode;

wherein the electronic control circuit comprises, an RC timing circuit coupled to a source of DC supply voltage, and first and second comparators each having one input coupled to the RC timing circuit and second inputs coupled to respective circuit nodes in respective voltage dividers coupled to the source of DC supply voltage.

* * * * *